C. R. Hardy,
Fly Trap.
No. 113,515.   Patented Apr. 11, 1871.

Attest:
Wm. C. Stineback
Eihu Jamieson

Inventor:
Clinton R. Hardy
by his Attys
A. M. Connett & Bro.

United States Patent Office.

CLINTON R. HARDY, OF LEXINGTON, INDIANA.

Letters Patent No. 113,515, dated April 11, 1871.

IMPROVEMENT IN FLY-TRAPS.

The Schedule referred to in these Letters Patent and making part of the same.

*To all whom it may concern:*

Be it known that I, CLINTON R. HARDY, of Lexington, in the county of Scott and State of Indiana, have invented an Improved Fly-Trap; and I do hereby declare the following to be a complete and accurate description of the same, reference being had to the accompanying drawing making part of this specification—

Figure 2:
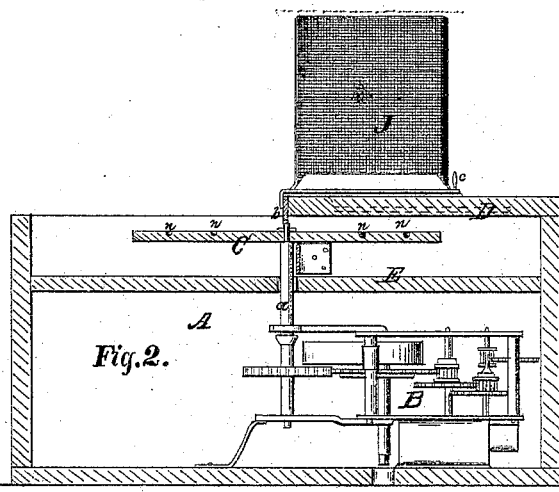
Figure 1:
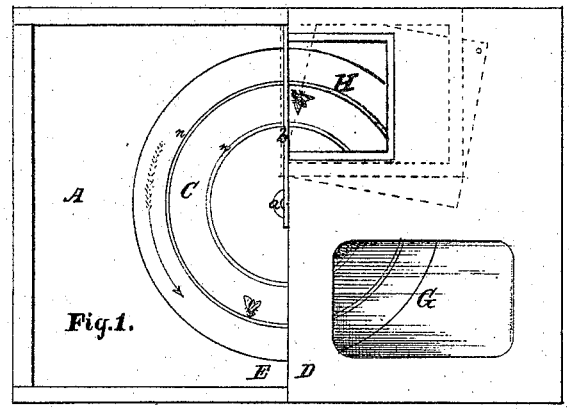
Figure 3:

Figure 1 being a plan of the same;
Figure 2, a longitudinal vertical section;
Figure 3, a transverse vertical section.

Like letters of reference designate corresponding parts in all the figures.

My invention consists in a horizontal rotating disk, provided on its upper surface with two or more concentric grooves or corrugations to receive the bait, and in furnishing the trap with a movable gauze chamber provided with a sliding bottom or valve.

Let A represent the body of the trap, and

B the machinery for revolving the disks C, the motive power being furnished by a spring.

The vertical shaft $a$, on the top of which the disk C is secured, is placed near the center of the trap, as shown in plan, fig. 1; and the disk rotates between two boards or plates, D and E, placed about half an inch apart, vertically.

The bottom plate E covers the entire trap, but the plate D covers only half of the trap and, consequently, half of the disk C, as will be seen in fig. 1.

This plate D has a glazed opening, G, to admit light, and an orifice, H, which opens into the movable gauze chamber J.

On one side of the shaft $a$, and secured to plate D, is a thin plate, $b$, so arranged as to effectually close the space between the upper surface of the disk C and the plate D. The corresponding space on the opposite side is left open.

The gauze chamber J is provided with a thin bottom, K, which is hinged or jointed at one corner, and provided with a handle, $c$, for closing it in or drawing it out.

The bait is placed in the corrugations or grooves $n$ $n$ in the disk C, and the machinery wound up and set going by means of the key $m$, as shown in the drawing.

The disk revolves slowly in the direction of the arrow, and the flies alighting on it, attracted by the bait, are carried under the cover D and around to the plate $b$, which startles them, and they arise through the opening H into the gauze chamber J. When a sufficient number is caught the sliding bottom K is closed in, and the chamber may be removed and the flies destroyed by dipping in hot water.

Having thus described my invention,

What I claim as new, and desire to secure by Letters Patent, is—

The concentrically-corrugated disk C, when used in a fly-trap, in combination with the movable gauze chamber J, all constructed and arranged to operate substantially in the manner and for the purposes set forth.

Witnesses:        CLINTON R. HARDY.
  HENRY M. WILSON,
  SAMUEL S. CROWE.